United States Patent
Gila et al.

(10) Patent No.: US 8,493,319 B2
(45) Date of Patent: Jul. 23, 2013

(54) ELECTRONIC PAPER WITH SEMICONDUCTING COATING

(75) Inventors: Omer Gila, Cupertino, CA (US);
Napoleon Leoni, San Jose, CA (US);
Henryk Birecki, Palo Alto, CA (US);
Richard Fotland, Franklin, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 288 days.

(21) Appl. No.: 13/160,954

(22) Filed: Jun. 15, 2011

(65) Prior Publication Data
US 2012/0320001 A1 Dec. 20, 2012

(51) Int. Cl.
*G09G 3/34* (2006.01)
(52) U.S. Cl.
USPC ........................................................ 345/107
(58) Field of Classification Search
USPC ........................................................ 345/107
See application file for complete search history.

(56) References Cited

U.S. PATENT DOCUMENTS

| | | | |
|---|---|---|---|
| 6,222,513 B1 * | 4/2001 | Howard et al. | 345/84 |
| 6,573,880 B1 * | 6/2003 | Simoni et al. | 345/87 |
| 6,795,228 B2 * | 9/2004 | Sacripante et al. | 359/296 |
| 7,663,582 B2 | 2/2010 | Schmitz et al. | |
| 7,875,307 B2 | 1/2011 | Lin et al. | |
| 2004/0263470 A1 * | 12/2004 | Sprague et al. | 345/107 |
| 2005/0134550 A1 * | 6/2005 | Schmitz | 345/107 |
| 2005/0134553 A1 | 6/2005 | Schmitz et al. | |
| 2006/0125778 A1 * | 6/2006 | Apte | 345/107 |
| 2007/0061214 A1 * | 3/2007 | Schmitz | 705/26 |
| 2008/0174531 A1 | 7/2008 | Sah | |
| 2008/0186259 A1 * | 8/2008 | Todorokihara et al. | 345/76 |

FOREIGN PATENT DOCUMENTS

JP 2001270145 A 10/2001

* cited by examiner

*Primary Examiner* — Evan Pert

(57) ABSTRACT

An electronic paper device includes a ground plane, a semiconducting layer in electrical communication with the ground plane, and an active layer interposed between the ground plane and semiconducting layer. The active layer includes a plurality of microcapsules containing charged pigments. A method for writing to electronic paper is also presented.

20 Claims, 9 Drawing Sheets

ELECTRONIC PAPER WITH SEMICONDUCTING COATING

BACKGROUND

Electronic paper ("e-paper") is a display technology designed to recreate the appearance of ink on ordinary paper. E-paper reflects light like ordinary paper and may be capable of displaying text and images indefinitely without using electricity to refresh the image, while allowing the image to be changed later. E-paper can also be implemented as a flexible, thin sheet, like paper. By contrast, a typical flat panel display does not exhibit the same flexibility, typically uses a backlight to illuminate pixels, and constantly uses power during the display. Typical e-paper implementations include an e-paper display and electronics for rendering and displaying digital media on the e-paper, such as electronic books ("e-books").

BRIEF DESCRIPTION OF THE DRAWINGS

The accompanying drawings illustrate various examples of the principles described herein and are a part of the specification. The illustrated examples are merely examples and do not limit the scope of the claims.

Throughout the drawings, identical reference numbers designate similar, but not necessarily identical, elements.

DETAILED DESCRIPTION

E-paper is used in a variety of display applications such as signage, e-books, tablets, cards, posters, and pricing labels. E-paper has several paper-like features. For example, e-paper is a reflective display which uses ambient light as an illumination source. The ambient light strikes the surface and is reflected to the viewer. The usage of pigments similar to those which are used in printing allows the e-paper to be read at a wide range of angles and lighting conditions, including full sunlight. The use of ambient light eliminates the need for illumination produced by the device. This minimizes the energy used by the e-paper. Additionally, the e-paper does not use energy to maintain the image. Once the image is written, the image remains on the e-paper for an extended period of time or until the e-paper is rewritten. Thus, a typical e-paper only uses energy for changes of state.

E-paper is typically written by generating a charge on the surface in proximity to a layer of microcapsules that contain charged pigment particles. The charge on the surface attracts or repels the charged pigment particles in the microcapsules to create the desired image. The pigment particles are stable within the microcapsules after they are moved into position. However, if the surface charges are undesirably disrupted soon after deposition, the position of the pigment particles may be disturbed. For example, touching the charged surface with a finger soon after printing can prematurely discharge the surface and result in a distorted image. This depends, among other things, on the electrical conductivity through the e-paper and the microcapsules bonding material. Additionally, handling unprotected e-paper could generate pressure which temporally or permanently destroys the image.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with the example is included in at least that one example, but not necessarily in other examples.

Figure 1A:
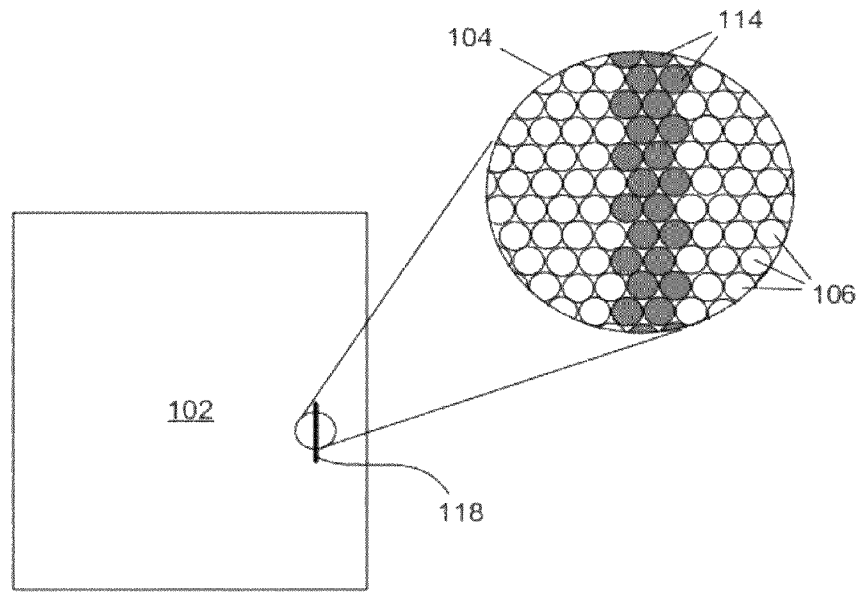
FIG. 1A is a plan view of an illustrative piece of electronic paper, according to one example of principles described herein.

FIG. 1A shows a plan view of an illustrative piece of e-paper 102 and includes an enlargement 104 of a small portion of the e-paper 102. The enlargement 104 shows that this e-paper implementation includes an array of embedded, spherical-shaped microcapsules 106, 114. The line 118 is created by selectively applying a charge to the e-paper 102. The charge moves the particles within the microcapsules 106, 114. In this example, a charge has been applied which moved dark particles to the front of the microcapsules 114 to form the line 118.

Figure 1B:
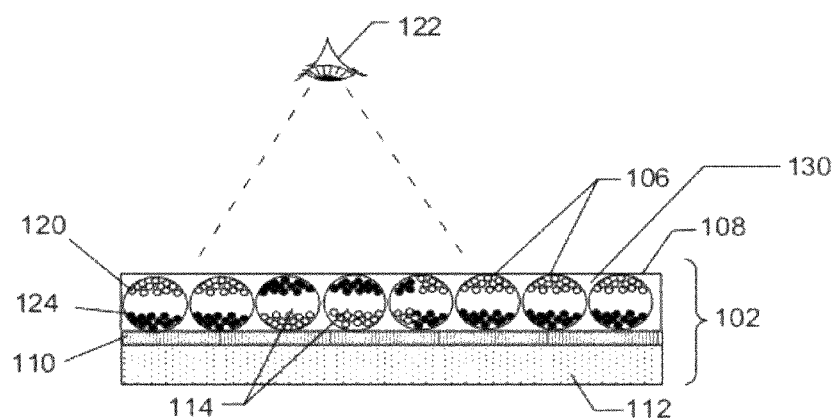
FIG. 1B is a cross sectional view of a portion of the electronic paper, according to one example of principles described herein.

FIG. 1B shows a cross-sectional view of a portion of the e-paper 102 shown in FIG. 1A. The cross-sectional view shows an illustrative multilayer structure of the e-paper 102, including an active layer with microcapsules 106, 114 sandwiched between a transparent charge receiving surface 108 and a conductive ground layer 110. The microcapsules 106 are held within a matrix 130. As shown in FIG. 1B, the conductive ground layer 110 is disposed on a substrate 112.

In this example, each of the microcapsules 106, 114 contains both white particles 120 and black particles 124 suspended in a fluid medium. The upper surface of the matrix 130 forms a charge receiving surface 108. Ambient light is transmitted through the charge receiving surface 108, strikes the pigment, and reflected back to the viewer 122. When white particles 120 of a microcapsule 106, 114 are located near the transparent charge receiving surface 108, the microcapsule 106, 114 appears white to a viewer 122, and when the black particles 124 of a microcapsule are located near the insulating surface 108, the microcapsule 114 appears black to the viewer 122. The particles can be of opposite charges. For example, the black particles 124 can be positively charged particles and the white particles 120 can be negatively charged particles. For example, the black particles 124 may be carbon based and the white particles 120 may be titanium oxide based. Various shades of gray can be created by varying the arrangement of alternating microcapsules 106, 114 with white and black particles 120, 124 located near the charge receiving surface 108 to produce halftoning.

The microcapsules 106, 114 are designed to exhibit image stability using chemical adhesion between particles and/or between the particles and the microcapsule surface. For example, the black and white microcapsules 106, 114 ideally can hold text and images indefinitely without drawing electricity, while allowing the text or images to be changed later.

The microcapsules 106, described in greater detail below, can have a diameter of approximately 50 µm but may also range in diameter from approximately 20 µm to approximately 100 µm. The conductive ground layer 110 can be composed of a transparent conductive material, such as indium tin oxide, or an opaque conductive material and can have a thickness ranging from approximately 5 nm to approximately 1 mm. In one example, the e-paper has a total thickness of approximately 100 µm. The substrate 112 can be composed of an opaque material or a transparent material and can range in thickness from approximately 20 µm to approximately 1 mm, or the thickness can be much larger depending on the how the e-paper is used. For example, the substrate 112 can be composed of polyester, plastic, or transparent Mylar. Also, the substrate 112 can be omitted and the layers can be mounted on a wall or a product chassis.

A variety of other configurations may be used. For example, the microcapsule may include black particles 124 suspended in a white colored fluid. The black particles 124 can be positively charged particles or negatively charged particles. One or more microcapsules 106, 114 form a pixel of black and white images displayed on the e-paper 102. The black and white images are created by placing black particles 124 near or away from the charge receiving layer 108. For example, the microcapsules 106 with black particles 124 located away from the transparent insulating layer 108 reflect white light, corresponding to a white portion of an image displayed on the e-paper. By contrast, the microcapsules 114 with black particles 124 located near the charge receiving surface 108, such as microcapsule 114, appear black to the viewer 122, corresponding to a black portion of the image displayed on the e-paper 102. Various shades of gray can be created by varying the arrangement of alternating microcapsules 106, 114 with black particles 124 located near or away from the charge receiving layer 108 using halftoning.

A variety of other implementations could also be used. For example, the microcapsules could include one species of charged particle in a colored medium (black particles in a white medium). Additionally, a transparent layer overlying the microcapsules may be tinted with alternating blue, red, and green regions. Adjacent blue, red, and green regions form color pixels. Color images are created by placing different combinations of white or black particles near the transparent tinted layer. For example, the microcapsules of color pixel with white particles located near the red and green regions of the transparent tinted layer reflect red and green light from the e-paper. The viewer 122 will perceive this combination as a yellow pixel. When the black particles in the microcapsules are located near the transparent tinted layer, that color pixel will appear black to the viewer 122. Additionally or alternatively, the black particles 124 of each microcapsule are replaced by either blue, red, or green particles that are positively or negatively charged. Particles could be used alone or in combination with a tinted transparent layer to create the desired color image.

Figure 2A:
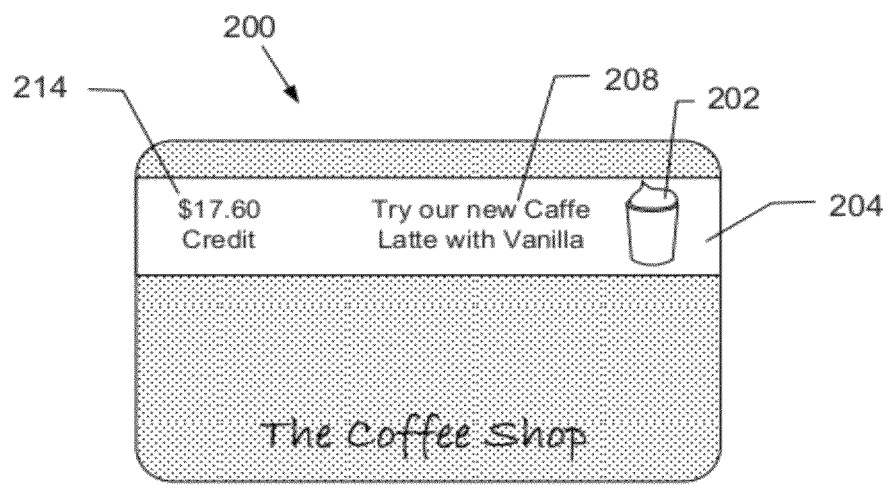
FIGS. 2A and 2B are examples of illustrative e-paper applications, according to one example of principles described herein.
Figure 2B:
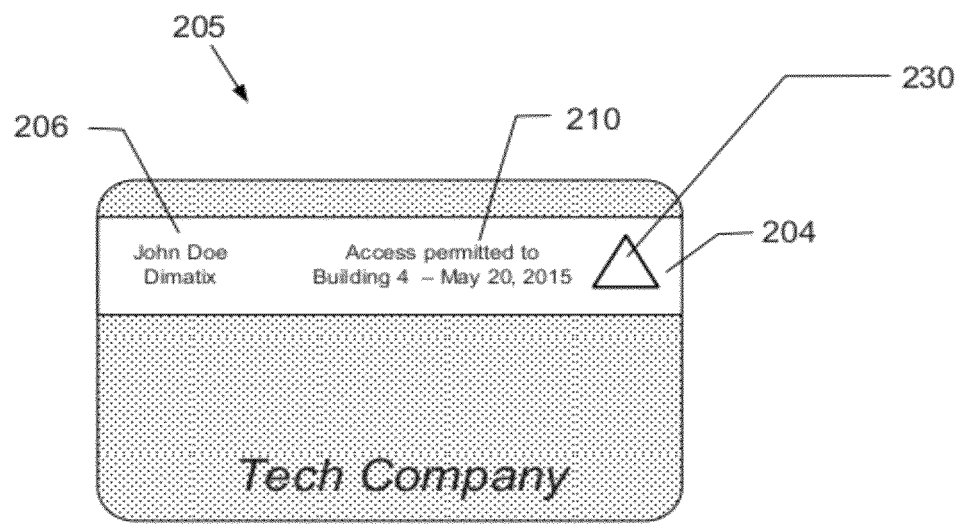

FIGS. 2A and 2B show two illustrative cards 200, 205 which use a strip of e-paper 204 across the width of the card to display information. The e-paper 204 may be used alone or in combination with a magnetic strip or embedded radio frequency circuitry. FIG. 2A is a gift card 200 used in a retail setting. The card 200 displays text 214 which communicates the amount remaining on the card 200. Additional text 208 and an image 202 describing a featured product are also included on the card 200.

FIG. 2B is a security card 205 which grants the user access to specific buildings for a predetermined period of time. The user's name 206 and access permissions 210 are printed on e-paper 204. A security symbol 230 is printed in the right portion of the e-paper. The use of e-paper 204 allows the user and others to visually identify the information which is associated with the card. For example, security symbol 230 could be changed every day to help prevent a security breach.

As discussed above, the information visually displayed on the cards may be electronically communicated by alternative technology to computing devices. For example, when making a purchase, the $17.60 which remains on the gift card 200 may be read from a magnetic strip on the back of the card by a credit card reader. The appropriate deduction can be made from the account and the new total and a new advertisement can be written on the e-paper strip 204 on the front of the card 200.

Similarly, the security card shown in FIG. 2B can be read from radio transmission circuitry that is embedded within the card. However, if the e-paper 204 has been appropriately secured against alteration, the information contained on card 205 could be read directly from the e-paper 204 using optical or charge based reading techniques. For example, security personnel may visually inspect the e-paper on the card 205 to ascertain the credentials of the carrier. Similarly, a cashier may simply read the amount 214 contained on the gift card 200 by looking at it. In other embodiments, the e-paper 204 could be optically or electronically scanned to retrieve the information in electronic format.

Figure 3:
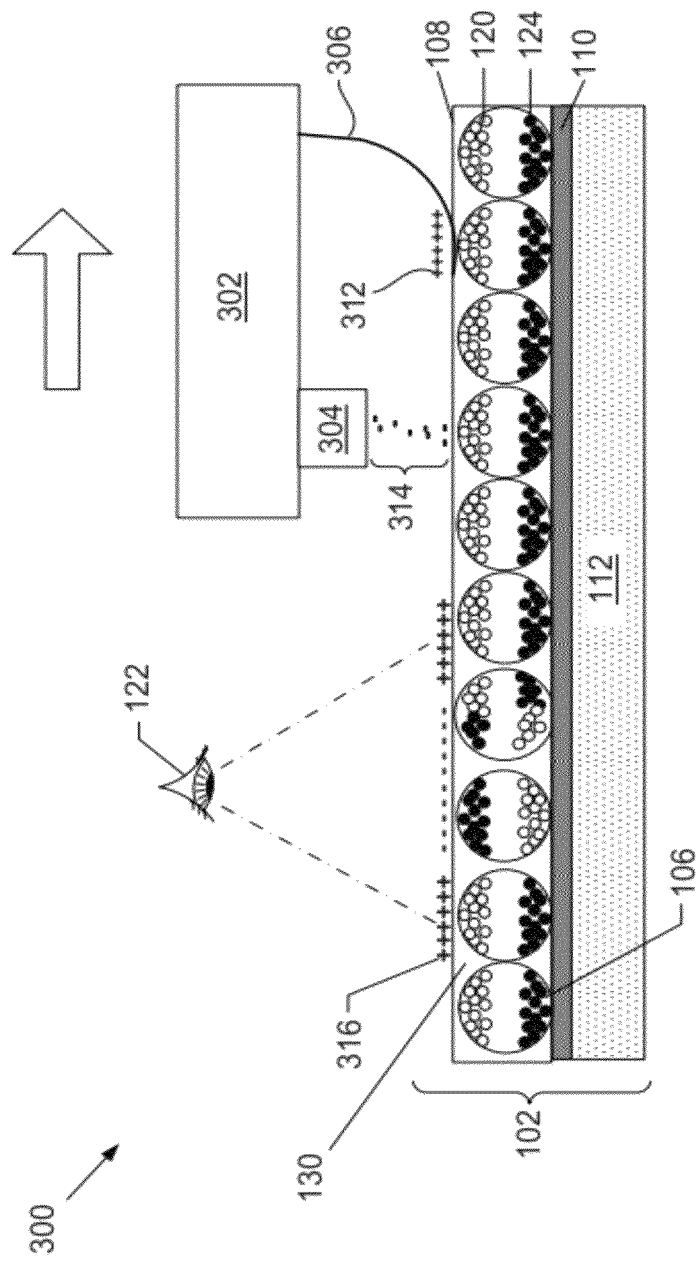
FIG. 3 is cross sectional diagram of an illustrative e-paper printing system, according to one example of principles described herein.

FIG. 3 shows a side view and schematic representation of an illustrative e-paper writing system 300. The writing system 300 includes a writing module 302, writing unit 304, and an erasing unit 306. The writing unit 304 and erasing unit 306 are connected to the same side of the writing module 302 that faces the outer surface 308 of the charge receiving surface 108, with the writing unit 304 suspended above the surface 308. In the example of FIG. 3, the writing unit 304 is an ion head. The erasing unit 306 can be an electrode that comes into close contact with, or can be dragged along, the surface 308 in front of the ion head 304. The writing module 302 can be moved in the direction indicated by the arrow and the e-paper 102 can be held stationary; or the e-paper 102 can be moved in the opposite direction and the writing module 302 held stationary; or the writing module 302 and e-paper 102 can be moved simultaneously. In the example shown in FIG. 3, the black particles and the white particles of the microcapsules are positively charged and negatively charged, respectively. The erasing unit 306 erases any information stored in the microcapsules prior to writing information with the ion head 304. In the example shown in FIG. 3, as the e-paper 102 passes under the writing module 302, the positively charged erasing unit 306 can remove negatively charged ions that are attached to the surface 308. The positively charge erasing unit 306 also creates electrostatic forces that drive positively charged black particles away from the charge receiving layer 108 and attract negatively charged white particles toward the charge receiving layer 108. By passing the erasing unit 306 over the charge receiving layer 108, the information written to the e-paper 102 is erased by positioning the negatively charged white particles near the top of the microcapsules and pushing the positively charged black particles to the bottom of the microcapsules.

FIG. 3 also shows an illustrative writing operation performed by the ion head 304. The ion head 304 is designed and operated to selectively eject electrons 314, shown as black bars, toward the charge receiving surface 108, when a region of the e-paper 102 located beneath the ion head 304 is to be changed from white to black. As the electrons 314 reach the surface 308, the negatively charged white particles are repelled and driven away from the charge receiving surface 108, while the positively charged black particles are attracted to the negatively charged electrons/ions 314 and driven toward the charge receiving surface 108. For example, as the ion head 304 passes over microcapsule 106 while ejecting electrons, the negatively charged white particles are repelled away from the insulating layer 108 and the positively charged black particles are driven toward the charge receiving surface 108.

The e-paper writing system 300 is not limited to implementation in which the ion head 304 discharges electrons and the erasing unit 306 erases information with positive charges. The microcapsules 106 in the active layer can be composed of negatively charged black particles and positively charged white particles. In other embodiments, the ion head 304 can be designed to produce positively charged ions, which can be absorbed by the surface 308. The erasing unit 306 can use negative charges to erase information stored in the microcapsule layer of the e-paper 102. In other embodiments, the writing unit 304 can be any charge injection device with sufficient addressability and resolution. For example, the writing unit 304 can be a plasma generating needle.

The e-paper configuration shown in FIG. 3 could suffer from image damage when the e-paper 102 is handled by a person after writing, pressure, moisture, oils from the person's hands, and static electricity or tribo charges carried by the person or generated by rubbing the surface 108 with other objects may alter the charge distribution over the surface 108. These charges may be large enough to cause a redistribution of white and black particles in microcapsules 106. Rapid removal of charges from the surface 108 might result in counter current inside the e-paper where the moving charges are the pigments 120, 124 themselves. Slower removal of charges from the surface 108 can be compensated by free non-pigmented charges in the microcapsules 106.

Figure 4A:
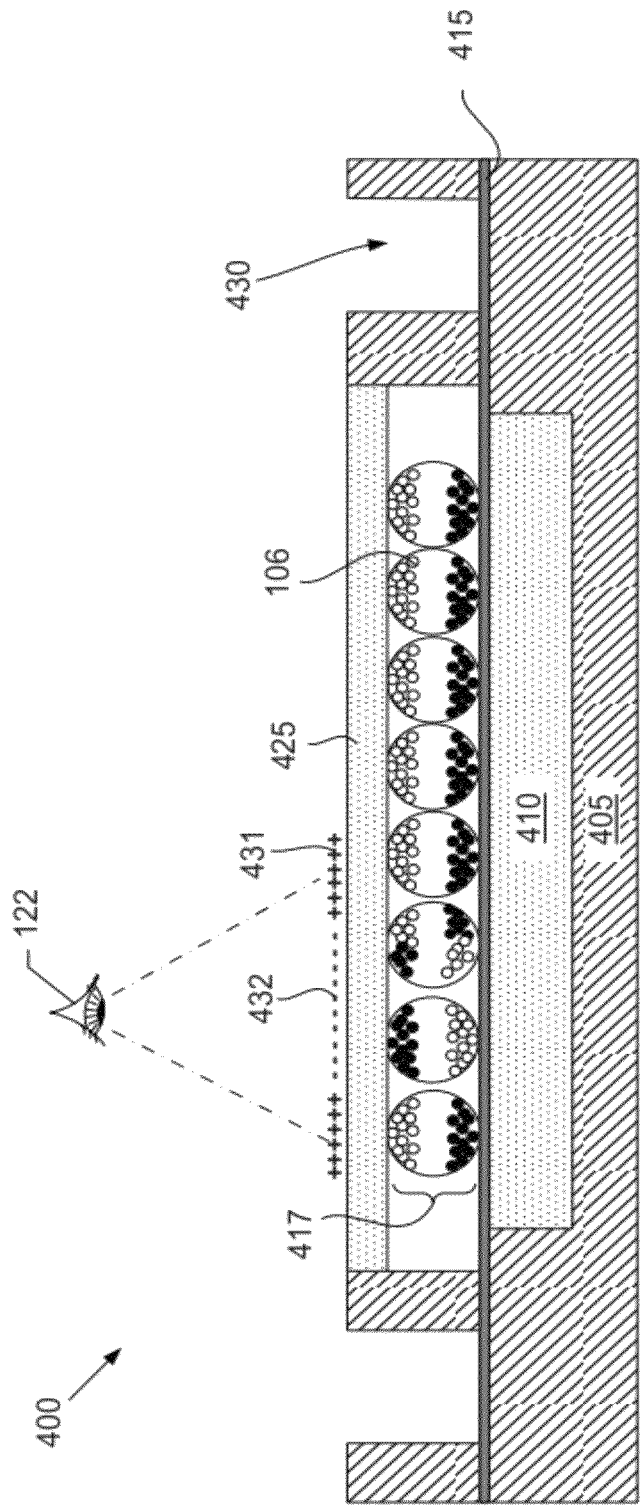
FIGS. 4A, 4B and 4C are cross sectional views of an illustrative e-paper structures, according to one example of principles described herein.

In order to increase the robustness of e-paper, a protective coating 425 as shown in FIG. 4A. This coating is designed to protect the e-paper and microcapsules from mechanical damage, pressure and impact, and from collecting tribo charges. It also designed to reduce increases in dot size due to field screening during charging (the "blooming effect"). In one implementation, the charge receiving layer 425 has semiconducting characteristics which allow for a controlled decay of the latent charge image.

FIG. 4A is a cross section of an illustrative e-paper structure which allows for controlled dissipation of charges. FIG. 4A includes a base 405 that structurally supports other components, a protective layer 410, a ground plane 415, microcapsules 106 in an active layer 417, and a charge receiving layer 425. The base 405 can be relatively thick, on the order of 500 μm or greater. Ground access windows 430 provide access to the ground plane through the base layer 405. During writing, electrical contact is made with the exposed portions of the ground plane 405 through the access windows 430. This allows biasing of the ion head while writing.

The protective layer 410 may be transparent or opaque and may have a thickness ranging from nanometers to millimeters. In one implementation, the protective layer 410 is formed from MYLAR film that has a thickness of approximately 100 microns. In one implementation, the protective layer 410 could be part of the e-paper roll manufacturing before being integrated into the card. The active layer 417 contains the microcapsules 106 and has a thickness which is commiserate with the diameter of the microcapsules 106. In one example, the active layer 417 has a thickness of 100 microns. The charge receiving layer 425 in this example is a transparent semiconducting material with a thickness between 50-250 microns.

As discussed above, deposition of charges 431, 432 onto the charge receiving layer 425 influences the distribution of charged pigments in the microcapsules 106. Specifically, positive charges on the charge receiving layer 425 attract negatively charge pigments in the microcapsules 106. In this example, the white pigments have a negative charge and the black pigments have a positive charge. Where negative charges 432 have been deposited on the charge receiving layer 425, the black pigments are attracted to the surface. When viewed through the charge receiving layer 425, the negatively charged areas of the charge receiving layer 425 appear black and the positively charged areas appear white.

As discussed above, the rapid dissipation of the charges 431, 432 from the charge receiving layer 425 can be undesirable because the current can result in motion of the pigments in the microcapsules 106. For example, touching the charge receiving surface 425 with a finger or brushing fabric against the charge receiving surface 425 may rapidly dissipate the charges 431, 432 and disrupt the image on the e-paper 400.

Figure 4B:
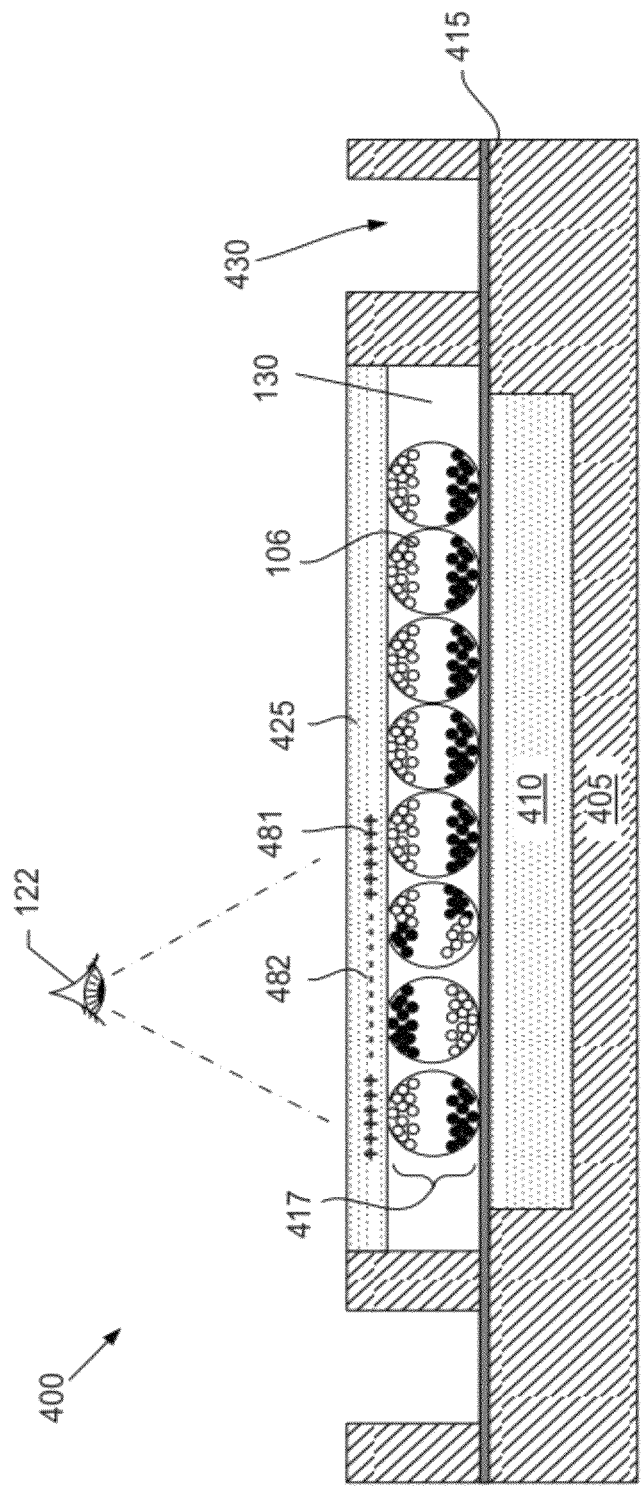

The charge receiving layer 425 in this example is formed from a semiconducting material which gradually dissipates the charges to the ground plane 415. The resistivity of the layer 425 is designed to enable fast movement of charges 432 and 431 through it as shown in FIG. 4B where charges 431 and 432 are moved to new locations 481 and 482 respectively. According to one example, the resistivity of the semiconducting charge receiving layer 425 may be selected such that the discharge time constant is less than the few seconds after writing but before the card is ejected from the device and returned to the card holder. The charges 832 and 831 will typically be transferred to the ground layer 415 through the layer 417. In particularly, the matrix material 130 may be selected to provide not only the desired optical and mechanical characteristics, but also the desired electrical resistivity.

Figure 4C:
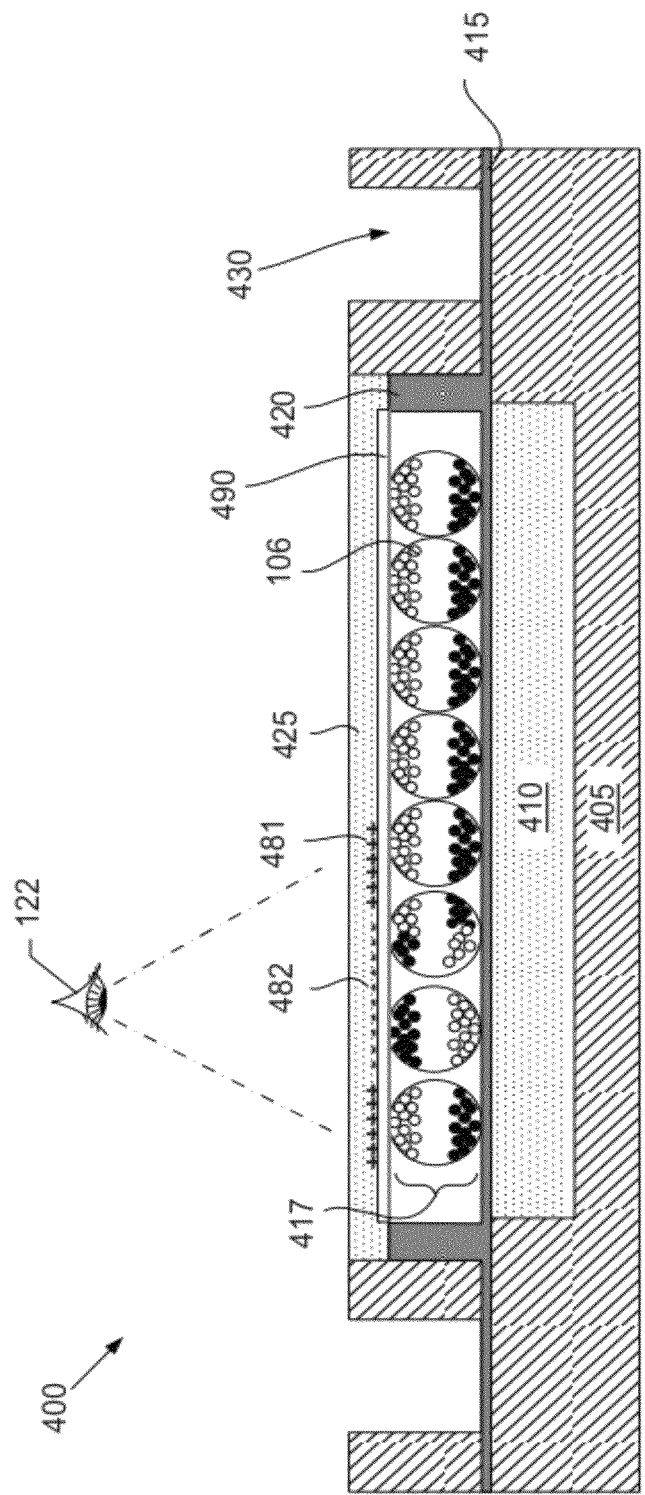

In some implementations, additional ground connection 420 can be used, as shown in FIG. 4C. For example, this ground connection 420 might be needed when the layer 417 is not sufficiently electrically conducting or when additional insulating layer 490 is introduced, as shown in FIG. 4C. In this example, the charges 481, 482 travel laterally through the semiconducting layer 425 and then down through the ground connections 420 to the ground plane 415. The resistivity of semiconducting charge receiving layer 425 is selected so that the desired image quality and dissipation time constant are obtained. When the resistivity of the semiconducting charge receiving layer 425 is too low, the electrostatic image formed on the surface of the charge receiving layer 425 may spread laterally during image formation. This lateral spreading may degrade both the resolution and intensity of the image. When the resistivity of the charge receiving layer 425 is too high, the dissipation time constant will be large and the charges 431, 432 may not dissipate through the semiconducting charge receiving layer 425 into the ground plane 415 prior to the formation of an external discharge path. The time constant τ can be approximated by the equation given below:

$$\tau \approx \rho \cdot \epsilon \cdot \epsilon_0$$

Where

τ is the time constant;

ρ is the resistivity;

$\epsilon$ is the dielectric constant; and $\epsilon_0$ is $8.85 \times 10^{-12}$ F/m.

In one example, $\epsilon=10$, and $\rho=10^9$ ohm centimeters. In this case, the time constant τ is approximately 0.1 second.

As discussed above, if an external discharge occurs, the image may be disrupted. The material and resistivity of semiconducting layer 425 is also designed to minimize tribo buildup on top of layer 425 during usage or storage. Triboelectric charging is a type of contact electrification which occurs when two materials are in contact and then separated. For example, rubbing a polymer layer against the clothing may generate triboelectric charging. To minimize tribo charge buildup, the semiconducting layer 425 may have a resistivity that does not exceed $10^9$ to $10^{11}$ ohm centimeters.

The semiconducting charge receiving layer 425 can also be designed to provide mechanical protection to the underlying layers. The semiconducting layer 425 can be designed to be soft and thick enough to resist/absorb mechanical impact so that normal surface pressure, from handling for example, does not damage or deform microcapsules in the e-paper 400.

However, the semiconducting layer also needs be hard enough to resist puncture from pointed objects. For example, the semiconducting layer may have a hardness between 10-100 Shore A. Alternatively the semiconducting layer could include two layers: a first hard layer that is in contact with the active layer 417 and has a Shore hardness of greater than 70 Shore A; and a top layer which is softer and has a hardness of less than 40 Shore A.

The semiconducting charge receiving layer 425 may have a resistance of between 10 and $10^{15}$ ohm-centimeters and a thickness between 10 and 200 µm. In some implementations, the semiconducting charge receiving layer 425 may have a resistance between $10^3$ and $10^{13}$ ohm-centimeters and a dielectric constant range of 3 to 20. In this example, the semiconducting charge receiving layer 425 is also transparent so reflections of the ambient light from the microcapsules 106 can be observed through the charge receiving layer 425.

Figure 5:
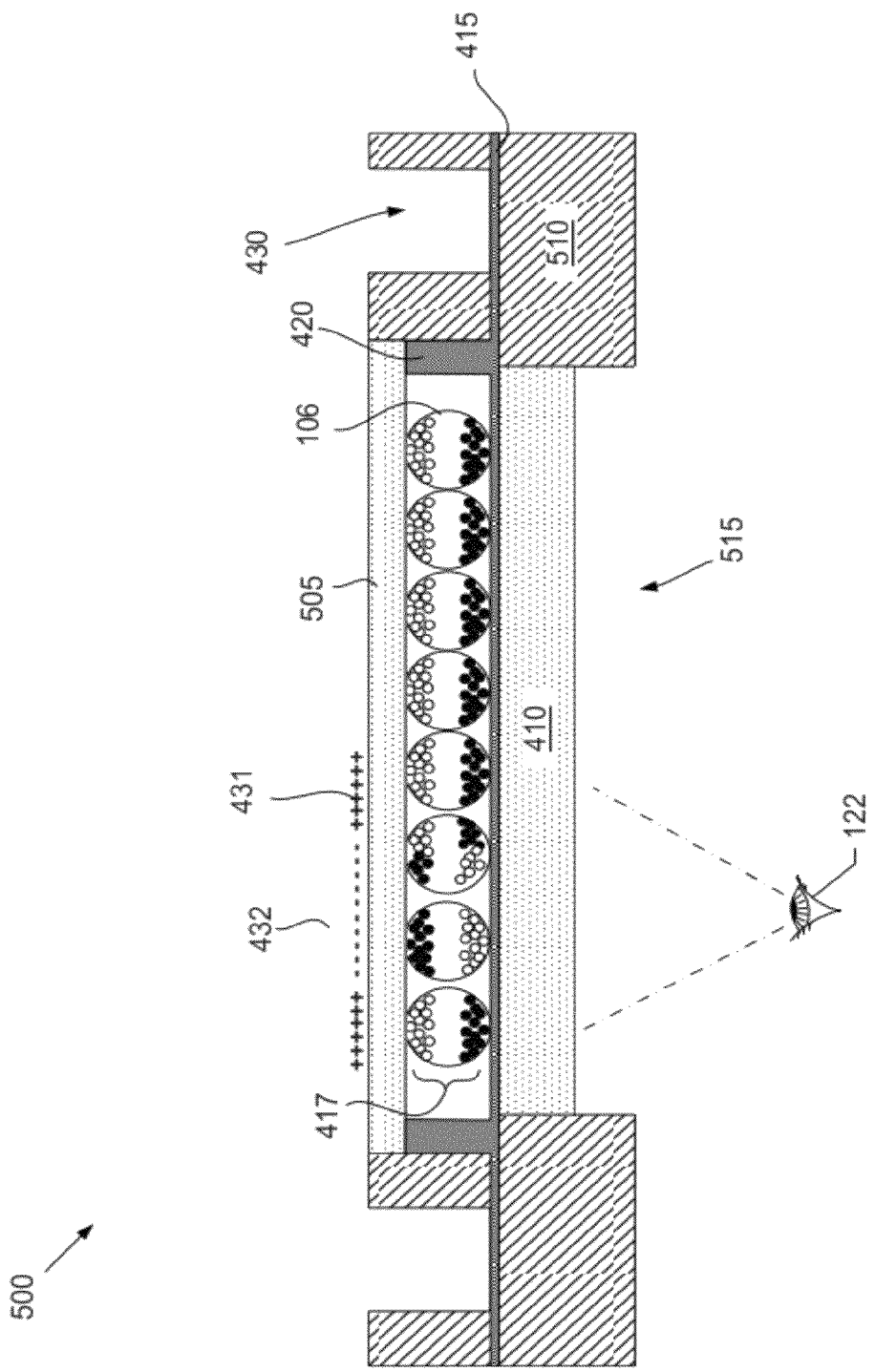
FIG. 5 is a cross sectional view of an illustrative e-paper structure which includes a semiconducting layer, according to one example of principles described herein.

FIG. 5 is a cross sectional view of an alternative example of an e-paper 500 in which the imaging side and viewing side are on opposite surfaces of the e-paper 500. The e-paper 500 includes a substrate 510, a ground plane 415, a semiconducting charge receiving layer 505, and an active layer 417 which contains microcapsules 106. The substrate 510 contains windows 430 which provide access to the ground plane 415. The substrate 510 also contains a window 515 through which a protective layer 410 can be viewed. Charges 431 and 432 from the top of layer 505 could be discharged to the 415 ground plane 415 via layers 417 and 505. In some implementations, an additional ground connection 420 can be added. The protective layer 410 and ground plane 415 have optical characteristics which allow the pigments in the microcapsules 106 to be viewed from the side opposite the imaging side. The protective layer 410 may be formed from a variety of materials, including glass and clear polymers such as MYLAR film.

In this implementation the semiconducting layer 505 no longer needs to be optically transparent or optically clear. Thus a wider range of semiconducting materials and compositions can be used to form the semiconducting layer 505 and the semiconducting layer 505 may be thicker to provide additional structural support.

Robustness of the semiconducting layer 505 is generally improved by the addition of a solid pigment to the coating. The thickness of a coating may be increased without decreasing the electrical resistance by incorporating a high dielectric constant pigment in the coating. The use of a high dielectric constant pigment allows for increased physical thickness and robustness of the semiconducting layer 505. For example, titanium dioxide is a high dielectric constant pigment that also provides toughness to coatings. In one implementation, the semiconducting layer 505 is formed from a tough cross-linking resin containing substantial amounts of titanium dioxide. Tests have shown that high performance white alkyd paints and white vinyl latex paints have performed well in this application. Dry coating thicknesses of between 10 and 150 microns provide high quality imaging with rapid charge decay. These charge decay times, to half value, have ranged from one to 20 seconds.

Figure 6A:
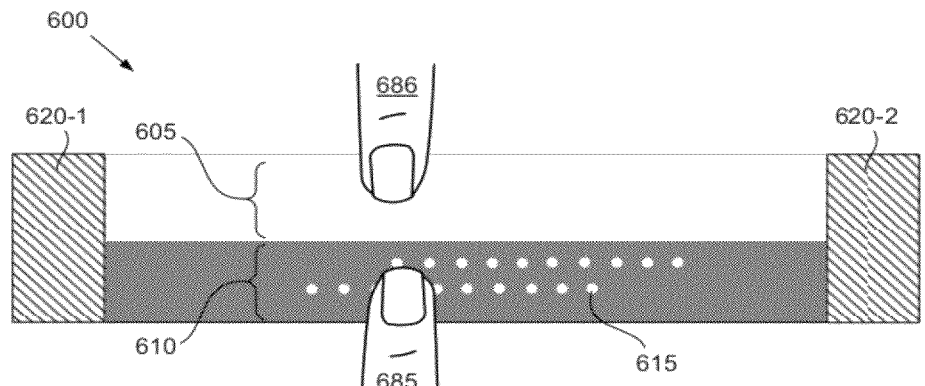
FIGS. 6A and 6B are plan views of an e-paper test coupon with a semiconducting coating, according to one example of principles described herein.
Figure 6B:
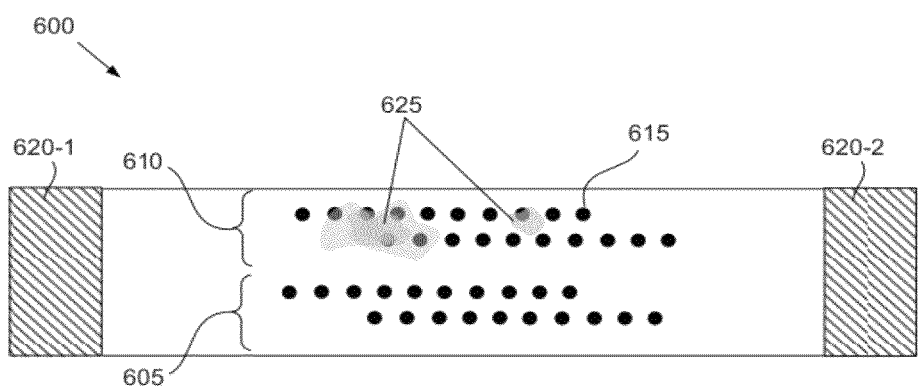

FIGS. 6A and 6B are plan views of both surfaces of a 15 mm by 40 mm test coupon 600 which was constructed and tested according to the principles described above. The test coupon 600 shown in FIGS. 6A and 6B has the structure which is similar to that shown in FIG. 5, with the charge receiving surface opposite the viewing side of the e-paper. In FIG. 6A, the charge receiving layer of e-ink surface is visible. A first portion 605 of the charge receiving layer was brush coated with a titanium oxide alkyd paint manufactured by Da Vinci Paint Company to form a semiconducting layer 505, FIG. 5 with an average thickness of approximately 150 microns. The first portion 605 of the test coupon had a structure and pigment charge configuration similar to that shown in FIG. 5. The coated portion 605 exhibited rapid charge decay. The uncoated portion 610 is adjacent to the coated portion 605. Ground electrodes 620 were located at either end of the test coupon 600.

An initial charge was deposited over both the coated portion 605 and uncoated portion 610 of the charge receiving layer using a negative corona. This pushed the negatively charged white pigments to the viewing surface opposite of the charge receiving surface. The initial charge had a voltage of 15 volts measured about ½ second after charging. Following this initial negative charging, an ion emitting print head was used to print a series of positive charges on the charge receiving surface. As discussed above, the positive charges repel the positively charged black pigments and attract the negatively charged white pigments. In FIG. 6A, the location of the positive charged deposited by the ion head are shown as two lines of white dots 615. A similar series of positive charges were deposited on the white semiconducting surface. However, the white dots on the coated portion 605 are covered by the semiconducting surface.

FIG. 6B is a plan view of the test coupon flipped 600 horizontally over so that the viewing surface is exposed. The viewing surface is primarily white due to the initial negative charges deposited by the corona. Four lines of black dots 615 show where the ion charges were deposited. The upper two rows were deposited on the uncoated portion 610 of the charge receiving surface and the lower two rows were deposited on the coated portion 605 of the charge receiving surface.

After ion printing, the test coupon 600 was handled to determine the stability of the image (685, 686). Handling had no effect on the two rows of dots printed on the semiconducting portion 605 because the charges had dissipated to the ground. Also, the layer 605 resisted handling and contact pressure. However, similar handling and pressure on the uncoated area 610 resulted in several discolored areas 625 on the test coupon 600. These discolored areas 625 result from physical damage to the microcapsules and/or charge fluctuations which cause a redistribution of white and black particles in the microcapsules.

The examples given above are only illustrative. A variety of semiconducting layers and deposition techniques can be used. The semiconducting film may be deposited using spraying, dipping, rod coating, screen printing, or other suitable deposition techniques. The semiconducting film may be formed from a variety of materials including polymer materials with pigment and/or non-pigment additives. In other implementations, a semiconducting film may be laminated to a surface of the electronic paper.

Figure 7:
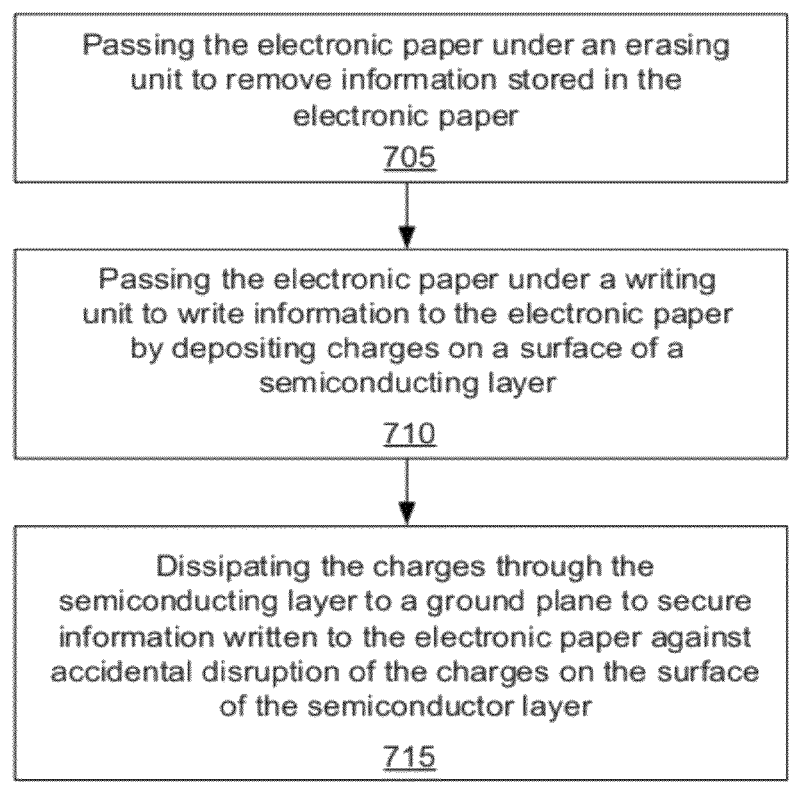
FIG. 7 is a flowchart showing an illustrative method for writing to electronic paper which includes a semiconducting coating, according to one example of principles described herein.

FIG. 7 is a flow chart of an illustrative method for writing to electronic paper which includes a semiconducting coating. In this example, the method includes passing the electronic paper under an erasing unit to remove information stored in the electronic paper (block 705). The erasing unit deposits charges over a semiconducting surface of the electronic paper. This moves pigments in the active layer of the electronic paper into a uniform position.

The electronic paper is passed under a writing unit to write information to the electronic paper by depositing charges on the surface of the semiconducting layer (block 710). The charges are dissipated through the semiconducting layer to a ground plane to secure information written to the electronic paper against accidental disruption of the charges on the surface of the semiconductor layer (block 715).

In conclusion, using a semiconducting layer as a charge receiving layer allows for controlled diffusion of deposited charges to ground. This neutralizes the latent charge image and prevents accidental and undesired switching of the image. Additionally, the semiconducting layer neutralizes charges which may come from other sources and protects the underlying active layer from damage.

The preceding description has been presented only to illustrate and describe examples of the principles described. This description is not intended to be exhaustive or to limit these principles to any precise form disclosed. Many modifications and variations are possible in light of the above teaching.

What is claimed is:

1. An electronic paper device comprising:
a ground plane;
a semiconducting layer in electrical communication with the ground plane; and
an active layer interposed between the ground plane and the semiconducting layer, the active layer comprising a plurality of microcapsules containing charged pigments.

2. The device of claim 1, in which the semi-conducting layer has an electrical resistance between $10^3$ and $10^{13}$ ohms per centimeter.

3. The device of claim 1, in which the semiconductor layer is in electrical communication with the ground plane through the active layer.

4. The device of claim 1, in which the semiconducting layer has a hardness ranging from 10 to 100 Shore A with a single or double layers.

5. The device of claim 2, in which the semiconducting layer conductivity is designed to resist triboelectric charging by having a resistivity of no more than $10^{11}$ ohm centimeters.

6. The device of claim 1, in which the semiconducting layer is transparent.

7. The device of claim 1, further comprising charges deposited on the semiconducting layer, the charges influencing a position of charged pigments in the active layer.

8. The device of claim 7, in which the charges deposited on the semiconducting layer dissipate through the semiconducting layer with a time constant, to half value, which is less than 20 seconds.

9. The device of claim 7, in which the charges deposited on the semiconducting layer are deposited by a device which is external to the electronic paper device.

10. The device of claim 1, further comprising electrical connections between the semiconducting layer and ground plane, in which charges deposited on the semiconducting layer dissipate through the semiconducting layer to the ground plane through the electrical connections.

11. The device of claim 10, in which the electrical connections are risers extending upward from the ground plane to the semiconducting layer.

12. The device of claim 11, in which the electrical connections between the ground plane and the semiconductor plane are made around the perimeter of the semiconducting layer.

13. The device of claim 1, in which the ground plane is transparent and the semiconducting layer is not transparent.

14. The device of claim 1, further comprising a substrate, the ground plane being deposited on the substrate.

15. The device of claim 14, in which the substrate comprises a window through which the ground plane can be viewed.

16. The device of claim 14, in which the substrate comprises windows through which the ground plane can be accessed from the semiconducting layer side of the device.

17. The device of claim 1, in which the semiconducting layer comprises an exposed surface for receiving electrical charges, the charges influencing a position of the charged pigments in the microcapsules.

18. An electronic paper device comprising:
a flexible substrate;
a ground plane disposed on the flexible substrate;
an active layer comprising a plurality of microcapsules containing charged pigments;
a semiconducting layer disposed over the active layer;
electrical charges deposited on an exposed surface of the semiconducting layer for positioning the charged pigments within the plurality of microcapsules;
in which the semiconductor layer conducts the electrical charges to the ground plane with a time constant, to half value, which is between 1 and 20 seconds.

19. A method for writing to electronic paper comprising:
passing the electronic paper under an erasing unit to remove information stored in the electronic paper;
passing the electronic paper under a writing unit to write information to the electronic paper by depositing charges on a surface of a semiconducting layer; and
dissipating the charges through the semiconducting layer to a ground plane to secure information written to the electronic paper against accidental disruption of the charges on the surface of the semiconductor layer.

20. The method of claim 19, in which a majority of the charges are conducted to the ground plane in less than twenty seconds.

* * * * *